United States Patent
Kawasaki et al.

(10) Patent No.: US 8,848,667 B2
(45) Date of Patent: *Sep. 30, 2014

(54) WIRELESS COMMUNICATION DEVICE

(75) Inventors: Yoshihiro Kawasaki, Kawasaki (JP);
Tsuyoshi Shimomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,449

(22) Filed: Apr. 2, 2012

(65) Prior Publication Data

US 2012/0188986 A1    Jul. 26, 2012

Related U.S. Application Data

(63) Continuation of application No. 12/408,966, filed on Mar. 23, 2009, now Pat. No. 8,194,612, which is a continuation of application No. PCT/JP2006/319325, filed on Sep. 28, 2006.

(51) Int. Cl.
*H04W 4/00* (2009.01)
*H04W 56/00* (2009.01)
*H04J 13/00* (2011.01)
*H04W 36/08* (2009.01)
*H04W 74/08* (2009.01)

(52) U.S. Cl.
CPC .......... *H04W 56/0085* (2013.01); *H04W 36/08* (2013.01); *H04J 13/0062* (2013.01); *H04W 74/08* (2013.01)
USPC ...................................................... 370/331

(58) Field of Classification Search
CPC .... H04W 80/04; H04W 72/04; H04L 3/0638; H04J 3/065; H04J 3/0655; H04J 27/2684
USPC ............ 370/350, 310, 3, 24, 328, 49, 8, 503, 370/507, 331, 335, 29, 208, 210, 509, 408, 370/342, 512, 514, 516, 329; 375/354, 355, 375/149; 704/500

See application file for complete search history.

(56) References Cited

U.S. PATENT DOCUMENTS 5,619,507 A * 4/1997 Tsuda ........................... 370/350
5,774,810 A   6/1998 Sugi (Continued)

FOREIGN PATENT DOCUMENTS

CN    1146701 A    4/1997
EP    1594336 A2   11/2005

(Continued)

OTHER PUBLICATIONS

Office Action issued for corresponding Canadian Patent Application No. 2,664,754, dated Aug. 27, 2012.

(Continued)

*Primary Examiner* — Chi Pham
*Assistant Examiner* — Alexander O Boakye
(74) *Attorney, Agent, or Firm* — Myers Wolin, LLC

(57) ABSTRACT

A mobile station that establishes an uplink wireless connection by transmitting a random access signal through a random access channel after receiving a synchronization channel transmitted from a radio base station in a handover destination, and includes a setting unit for setting a timing of transmitting the random access signal to be later than the timing of receiving the synchronization channel by a prescribed period.

7 Claims, 10 Drawing Sheets

(56) References Cited

U.S. PATENT DOCUMENTS

| | | | |
|---|---|---|---|
| 6,567,383 | B1 | 5/2003 | Bohnke |
| 6,567,482 | B1 | 5/2003 | Popovic |
| 6,741,579 | B1 | 5/2004 | Choi et al. |
| 7,792,212 | B2 * | 9/2010 | Lee et al. .................. 375/295 |
| 8,194,612 | B2 * | 6/2012 | Kawasaki et al. ......... 370/331 |
| 2006/0050799 | A1 | 3/2006 | Hou et al. |
| 2006/0153282 | A1 | 7/2006 | Jung et al. |
| 2009/0052504 | A1 * | 2/2009 | Tanae ....................... 375/149 |
| 2009/0280738 | A1 * | 11/2009 | Kim et al. ................ 455/3.01 |

FOREIGN PATENT DOCUMENTS

| | | |
|---|---|---|
| EP | 1594336 A3 | 11/2005 |
| JP | 11-285059 | 10/1999 |
| JP | 2000-032565 | 1/2000 |
| JP | 2002-300628 | 10/2002 |
| JP | 2003-244742 | 8/2003 |
| KR | 10-2006-82744 | 7/2006 |
| RU | 2198474 C2 | 2/2003 |
| WO | 98/21910 | 5/1998 |
| WO | 2005/109693 | 11/2005 |
| WO | 2006/015108 | 2/2006 |
| WO | 2006/022530 | 3/2006 |
| WO | 2006/112179 | 10/2006 |

OTHER PUBLICATIONS

The Federal Service on Industrial Property, Federal State Budget Institution "The Federal Institute for Industrial Property" (FIIP), "Official Action" issued for corresponding Russian Patent Application No. 2011113341, dated Feb. 1, 2012. Full English translation attached.

Motorola et al.; 3GPP TSG RAN1#44-bis; "E-UTRA Random Access Channel TP" R1-061083; Athens, Greece, Mar. 27-30, 2006. [Online] The 3rd Generation Partnership Project. Retrieved Dec. 13, 2006: URL:http://www.3gpp.org/ftp/tsg_ran/WG1_RL1/TSGR1_44bis/Docs/R1-061083.zip, Paragraph 9.1.2.1.3.

3GPP TR 25.814 V1.5.0; 3rd Generation Partnership Project; Technical Specification Group Radio Access Network; Physical Layer Aspects for Evolved UTRA (Release 7); Technical Report; Dated May 2006.

Motorola; 3GPP TSG RAN1 LTE Ad Hoc, R1-061710; "Preamble Sequence for Non-Synchronized Random Access" Agenda Item: 4.1; Cannes, France, Jun. 27-30, 2006.

Fujitsu; 3GPP TSG RAN WG1#45, R1-061284; "Cubic Metric properties of CAZAC sequences" Agenda item: 11.2.1 (UL reference signal); Shanghai, China, May 8-12, 2006.

Texas Instruments; 3GPP TSG RAN WG1 Ad Hoc on LTE, R1-051062; "On Uplink Pilot in EUTRA SC-FDMA" Agenda Item: 8.2; San Diego, USA, Oct. 10-14, 2005.

NEC Group; 3GPP TSG RAN WG1 Meeting #45, R1-061311; "Considerations on uplink pilot design using CAZAC sequences" Agenda Item: 11.2.1; Shanghai, China, May 8-12, 2006.

Motorola; 3GPP TSG RAN1#44; R1-060390; "EUTRA SC-FDMA Uplink Pilot/Reference Signal Design & TP" Agenda Item: 13.2.2.2; Denver, USA, Feb. 13-17, 2006.

International Search Report with written opinion for corresponding International Application No. PCT/JP2006/319325. Dated Dec. 14, 2006.

Rospatent the Federal State Institute "The Federal Institute for Industrial Property of the Federal Service for Intellectual Property Patents and Trade Marks", "Official Action" issued for corresponding Russian Patent Application No. 2011113343/07, dated Feb. 16, 2012. Full English translation attached.

The Intellectual Property Office of China "First Notification of Office Action" issued for corresponding Chinese Patent Application No. 200680055955.0, issued Apr. 8, 2011. English translation attached.

Intellectual Property Office of Japan, "Notice of Rejection Grounds" issued for corresponding Japanese Patent Application No. 2008-536248 mailed Mar. 8, 2011. English translation attached.

Korean Intellectual Property Office "Notice of Preliminary Rejection" issued for corresponding Korean Patent Application No. 10-2009-7007442, mailed Jan. 10, 2011. English translation attached.

Japanese Patent Office "Notice of Rejection Grounds" issued for corresponding Japanese Patent Application No. 2008-536248, mailed Nov. 9, 2010. Partial English translation attached.

Russian Patent and Trademark Office (RUPTO) "First Official Action" for corresponding Russian Patent Application No. 2009113336, dated Jun. 1, 2010. Full English translation by (FGI FIIP) attached.

NTT DoCoMo, Inc., Nokia, Samsung, NEC, Panasonic, Motorola; "Text Proposal for TR 25.912, 13.6 Mobility"; Agenda Item: 11.3.3; 3GPP TSG RAN WG2 #53; Tdoc-R2-061703; May 8-12, 2006; Shanghai, China.

Extended European search report with the European search opinion issued for corresponding European Patent Application No. 06810772.1 dated Jun. 4, 2012.

Nortel Networks; "Consideration on UL RACH scheme for LTE"; Agenda Item: 13.2.3.1; Meeting #44; Feb. 13-17, 2006; R1-060653; 3GPP RAN1; Denver, United States of America.

The extended European search report and the European search opinion issued for corresponding European Patent Application No. 13153169.1, dated Apr. 17, 2013.

The extended European search report and the European search opinion issued for corresponding European Patent Application No. 13192445.8, dated Feb. 5, 2014.

First Notification of Office Action issued for corresponding Chinese patent application No. 201210148734.5, issued Mar. 21, 2014, with English translation.

First Office Action issued for corresponding Indian Patent Application No. 1448/KOLNP/2009 dated Mar. 11, 2014.

* cited by examiner

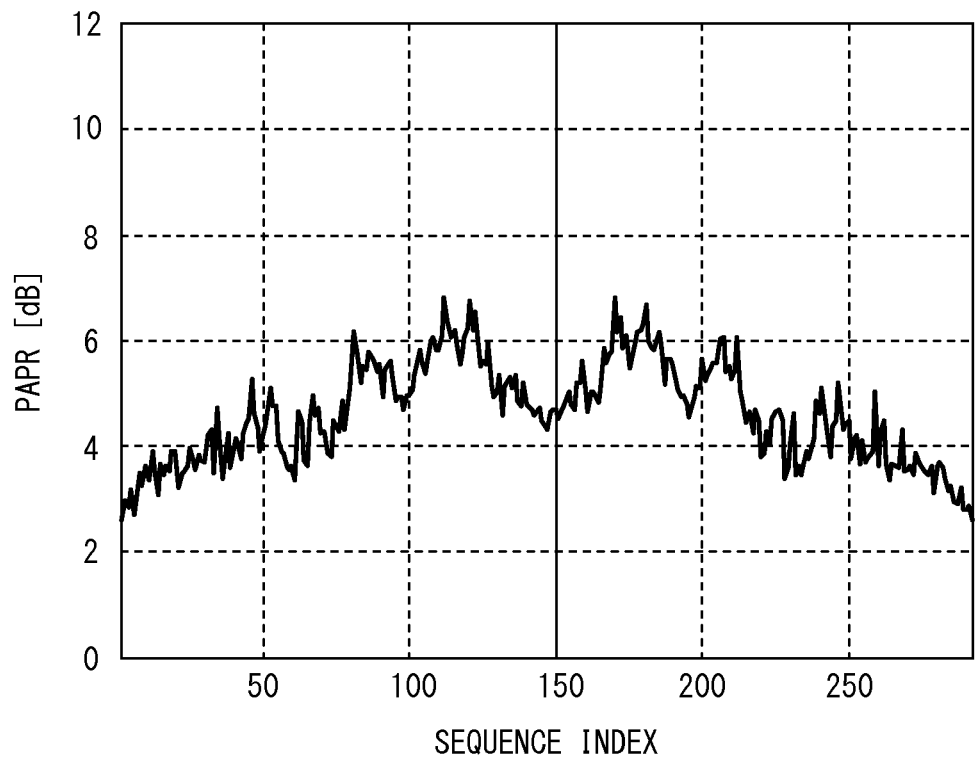
F I G. 2

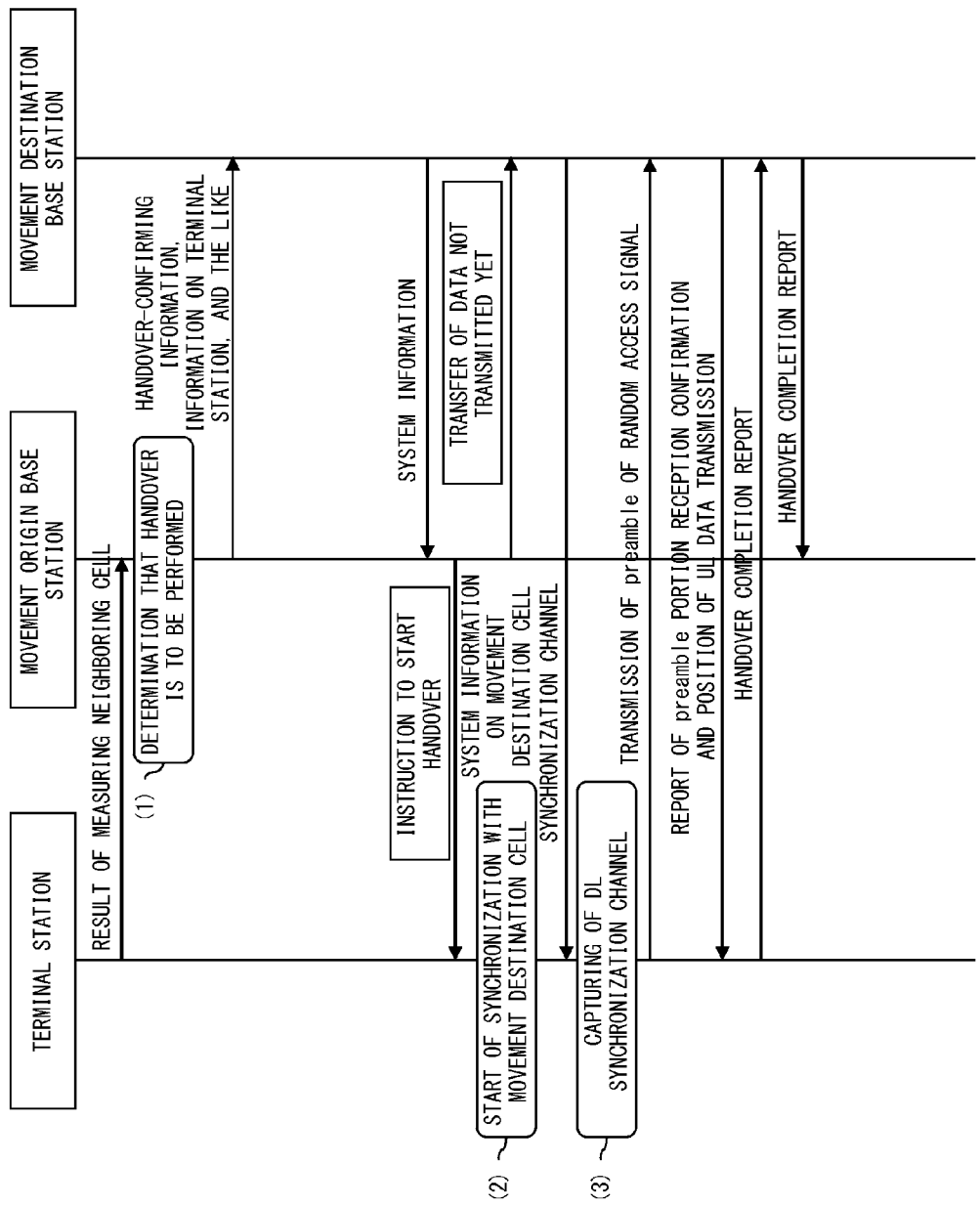
F I G. 7

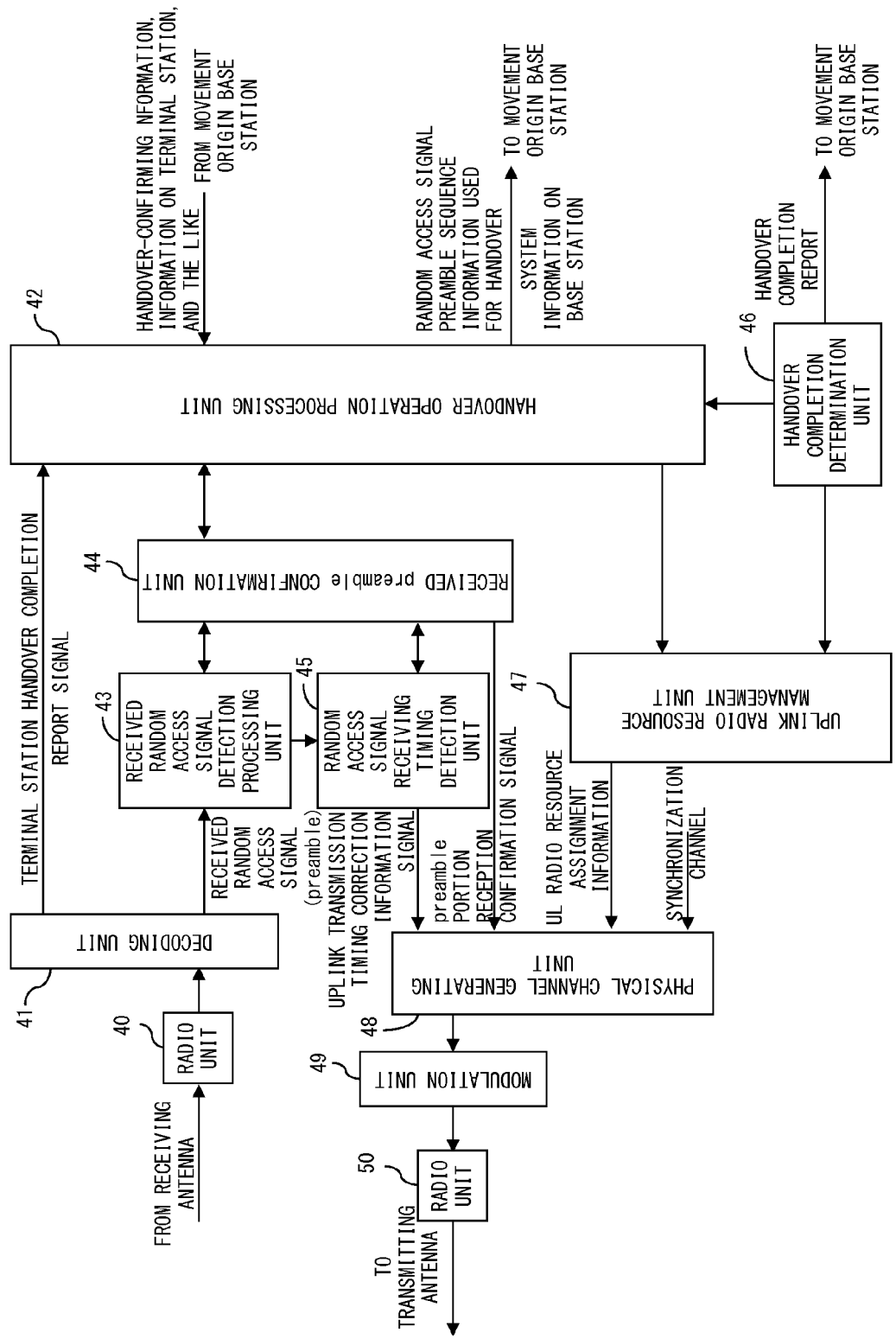

WIRELESS COMMUNICATION DEVICE

CROSS REFERENCE

The present application is a continuation of U.S. application Ser. No. 12/408,966, filed on Mar. 23, 2009, now pending, which is a continuation of International Patent Application No. PCT/JP2006/319325, filed on Sep. 28, 2006, the contents of each are herein wholly incorporated reference.

TECHNICAL FIELD

The present invention relates to a wireless communication device for transmitting a random access signal when a mobile terminal synchronizes itself with a base station.

BACKGROUND ART

In EUTRAN (Evolved UTRAN), which is currently being examined as the next generation system according to the 3GPP, a handover performed between different cells respectively covered by different base stations in response to the moving of a mobile terminal station is handled as a hard handover. In order to perform a hard handover, a line that connects a mobile terminal and a base station before the moving of the mobile terminal is disconnected, and thereafter a line between the mobile terminal and another base station covering the movement destination is connected. Although a handover can be performed in a short period even when that handover is a hard handover by obtaining system information on the base station covering the movement destination immediately before performing the handover, the transmission of user data is interrupted during the handover.

In the EUTRAN, the usage of a CAZAC (Constant Amplitude Zero Auto Correlation) sequence as a sign used in the preamble portion of a data frame is dominant. The preamble portion of a data frame contains a random access signal transmitted in an uplink line. A Zadoff-Chu sequence, a GCL sequence, etc. can be used as a CAZAC sequence. An expression expressing a Zadoff-Chu sequence is given below, where L represents a sequence length, and k represents a sequence index. Particularly when the length l is a prime number, an excellent autocorrelation characteristic and a cross-correlation characteristic are obtained.

$$c_k(n) = \exp\left[\frac{j2\pi k}{L}\left(n + n\frac{n+1}{2}\right)\right] \text{ if } L \text{ is odd} \quad \text{[Expression 1]}$$

$$c_k(n) = \exp\left[\frac{j2\pi k}{L}\left(n + \frac{n^2}{2}\right)\right] \text{ if } L \text{ is even}$$

FIG. 1 is a block diagram illustrating an example of a circuit generating, from a CAZAC sequence, a preamble portion of a random access signal used in a wireless uplink according to the EUTRAN.

A CAZAC sequence with a length of M(L) is subject to a serial/parallel conversion, and is input into a DFT unit 10, and thereafter is Fourier-transformed into a parallel signal with parallel number M. This signal is input into a subcarrier mapping unit 11, and is mapped into N subcarriers. The subcarrier signals obtained by mapping the CAZAC sequence are input into an IFFT unit 12, and are subject to an inverse Fourier transform, and thereafter are input into a parallel/ serial conversion unit 13. A signal with parallel number N output from the IFFT unit 12 is converted into a serial signal by the parallel/serial conversion unit 13, and is output as a random access preamble sequence.

Further, according to the EUTRAN, the maximum system bandwidth (a sending/receiving bandwidth used in a wireless transmission line by base stations) for transmission and reception in the radio section is 20 MHz, and the transmission/reception minimum bandwidth for terminal stations is currently set to be 10 MHz. This means that terminal stations are capable of transmitting and receiving signals having a bandwidth of at least 10 MHz. Also, it is considered that cells can be arranged in such a manner that base stations having different system bandwidths are adjacent to each other. In order to permit terminal stations to perform the initial search and to become a handover target easily regardless of the system bandwidths, synchronization channels and broadcast signal channels (a broadcast signal channel is a channel for transmitting information on cells and base stations, and is referred to as a broadcast channel hereinafter) are arranged around the middle of the downlink transmission bandwidth. However, it is also considered that synchronization channels can be arranged at two or three portions in a transmission bandwidth when the system transmission bandwidth is 20 MHz. This is based on the consideration of the existence of a mobile terminal station transmitting and receiving signals having a bandwidth of 10 MHz.

In any of the cases described above, synchronization channels are not always inserted into all subframes, and a synchronization channel is set to be inserted into every 5, 10 or 20 subframes to be transmitted.

According to the EUTRAN, a handover between adjacent cells covered by different base stations is handled as a hard handover, and in a hard handover, when a mobile terminal station starts a handover while it is transmitting data, a downlink transmission being performed targeting that mobile terminal station is interrupted, and the downlink data is transferred to the base station in the handover destination from the base station that has been communicating with that mobile terminal device. Also, a buffer in a base station has to accumulate the downlink data for the mobile terminal device until the handover is completed, and as a period required for performing a handover becomes longer, the amount of data that is accumulated in a buffer increases as well. Similarly, uplink data to be transmitted from the mobile terminal station to the base station has to be prevented from being transmitted when a handover has started, and has to be accumulated in a buffer in a mobile terminal station. In such a case, some data may be discarded in a process of the handover, which requires retransmission using a higher-level layer in the case of normal data. Further, when a handover has started with successive pieces of data being transmitted on the basis of the HARQ (Hybrid Automatic Repeat request), the order of sequence numbers assigned to the successive pieces of data may be changed. Also, when a handover is performed while an audio communication is being performed using speech packets, the downlink speech packets are transferred to the base station in the handover destination; however, it is impossible to avoid an interruption. Also, audio communication is real time communication, and accordingly all speech packets transferred are not always utilized effectively in the transfer destination.

Because of the above facts, it is not desirable for a handover to consume a long period of time regardless of whether data being transmitted is normal data or speech packets.

In a process of a handover, a terminal station has to capture a downlink synchronization channel transmitted from the base station in the handover destination, has to synchronize itself with the base station, and has to transmit a random access signal in an uplink channel. If a random access signal can be transmitted immediately after the completion of the downlink synchronization, time consumed by a handover can be reduced.

Also, when CAZAC sequences are used as the preamble portions of random access signals, the values of the PAPR (peak-to-average power ratio) of the preamble portions vary depending upon the values of the index k even when the length l of the CAZAC sequences used does not vary.

FIG. 2 depicts a PAPR characteristic of a preamble signal having a bandwidth of 5 MHz and using a Zadoff-Chu sequence.

The sequence length of the Zadoff-Chu sequence used in the illustration of FIG. 2 is fixed; however, the index k is changed to various values in order to check the values of the PAPR. This graph illustrates that differences equal to or greater than 3 dB can be caused in the values of the PAPR depending on the values of the index. The higher the PAPR a sequence has, the greater the peak power in comparison with the average power.

If a signal waveform of a preamble portion is not to be distorted upon the transmission of the preamble portion by a mobile terminal station, the back-off amount of the transmitting power of the transmission unit power amplifier of the mobile terminal station has to increase as the PAPR of the CAZAC sequence used as the preamble increases. As an amplifier operates with a greater back-off amount, the amplifier consumes more power. In other words, a transmission unit power amplifier presents a linear amplification characteristic with a smaller input power, whereas this amplification characteristic becomes non-linear with an input power around and greater than a certain input power value that is determined by the amplifier itself, and thereby the amplification ratio is saturated and decreases. When a signal using a CAZAC sequence with a high PAPR as a preamble is to be amplified, the difference between the average power and the peak power in this signal is great so that the peak power is not linearly amplified due to the saturation, resulting in a distortion in the signal if the position at which the average power is input is around the saturation region of the amplification characteristic of the amplifier. Accordingly, elimination of the distortion in a signal requires lowering of the average power of a signal input into the amplifier so that the power does not reach the region in which the amplification characteristic of the amplifier is saturated. A point including the average power of an input power or an output power in the amplification characteristic of an amplifier is referred to as an operating point, and an amount of a reduction from the output saturation point is referred to as a back-off amount.

Non-patent document 1 discloses specifications for the EUTRAN. Non-patent document 2 includes a description about CAZAC sequences such as a Zadoff-Chu sequence, etc.

Non-Patent Document 1:
 3GPP TR25.814
Non-Patent Document 2:
 3GPP TSG RAN1LTE Ad Hoc R1-061710

DISCLOSURE OF THE INVENTION

It is an object of the present invention to provide a wireless communication device that can minimize a period during which data transmission is interpreted instantaneously for a handover so that a handover is effectively performed in a mobile communication system in which handovers are performed.

When a handover is performed, a mobile terminal station is near the edge of a cell, and accordingly a transmission power required to generate a preamble signal transmitted from such a mobile terminal station so that it can be successfully received by the reception unit of the base station is greater than that required to generate the same preamble signal transmitted from another mobile terminal station near the base station. Also, a transmission power required to transmit a preamble portion of a random access signal from a mobile terminal station near the edge of a cell having a large radius can sometimes be greater than the maximum transmission power of the mobile terminal station.

Further, when a handover is performed, a terminal station has to capture a downlink synchronization channel transmitted from the base station in the handover destination, has to synchronize itself with the base station, and has to transmit a random access signal in an uplink channel. If a random access signal can be transmitted immediately after the success in the downlink synchronization, the time consumed by a handover can be reduced. Therefore, the present invention uses a wireless communication device dividing uplink and downlink frequency bandwidths into narrower frequency bandwidths, assigns data to the narrower frequency bandwidths, and performs wireless communication, the wireless communication device comprising: synchronization signal capturing unit for capturing, when receiving a notice requiring a handover to be performed, a synchronization signal transmitted from a base station in a handover destination; and synchronization establishment signal transmission unit for transmitting a synchronization establishment signal for establishing synchronization with a base station in the handover destination, by using a frequency position in an uplink frequency bandwidth at a time point later than a timing of capturing the synchronization signal by a prescribed period.

Desirably, a frequency position for transmitting a synchronization signal in a downlink frequency bandwidth is the same as a frequency position for transmitting a synchronization establishment signal in an uplink frequency bandwidth. For example, when a frequency position for transmitting a synchronization signal in a downlink frequency bandwidth corresponds to the center frequency, a synchronization establishment signal is transmitted at the central frequency position in an uplink frequency bandwidth. It is an object of the present invention to suppress an increase in the backing off of transmission power caused by a signal (such as a preamble portion of a random access signal) transmitted from a place distant from a radio base station.

The present invention uses a mobile station establishing an uplink wireless connection by transmitting a random access signal through a random access channel after receiving a synchronization channel transmitted from a radio base station in a handover destination, comprising: a preamble generating unit for restricting a CAZAC sequence used as a preamble of the random access signal to a prescribed CAZAC sequence from among a plurality of CAZAC sequences with different indexes, and generating the preamble of the random access signal using the prescribed CAZAC sequence.

BRIEF DESCRIPTION OF THE DRAWINGS

FIG. 2 depicts a PAPR characteristic of a preamble signal having a bandwidth of 5 MHz and using a Zadoff-Chu sequence;

FIG. 7 illustrates a sequence used when a handover is performed on the basis of an embodiment of the present invention (third);

FIG. 10 is a block diagram illustrating a configuration of a movement destination base station when a handover is performed according to the present invention.

BEST MODES FOR CARRYING OUT THE INVENTION

Figure 1:
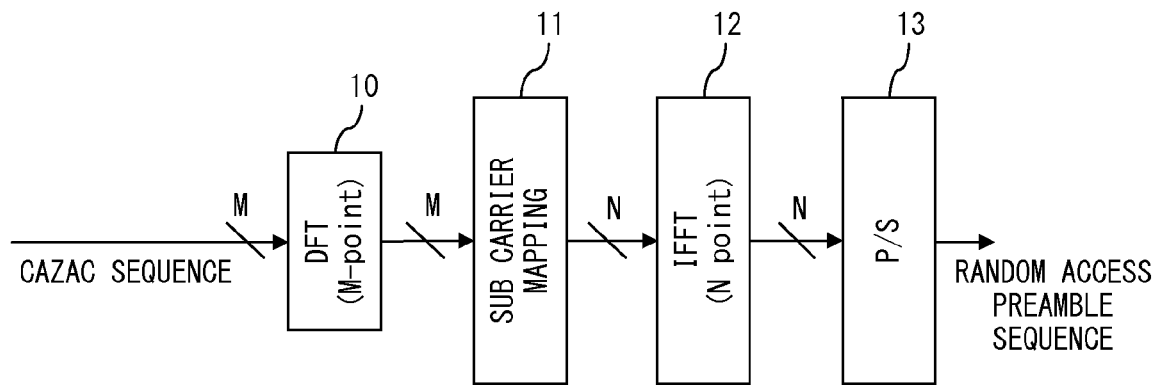
FIG. 1 is a block diagram illustrating an example of a circuit generating, from a CAZAC sequence, a preamble portion of a random access signal used in a wireless uplink according to the EUTRAN.

In an embodiment of the present invention, the measures as described below are taken.

[1] The timing and frequency at which a mobile terminal station can transmit an asynchronous random access signal to the movement destination base station (the base station in the handover destination) is determined by a timing that is on a sub-band in an uplink radio section of the movement destination cell, said sub-band corresponding to a sub-band (a frequency domain in which a synchronization channel is transmitted as one of plural frequency domains obtained by dividing the entire wireless transmission bandwidth used for radio communications) in which a synchronization channel is transmitted in a downlink radio section in the movement destination cell and that is a timing (in the subframe corresponding to the timing) offset by a prescribed period from a position of the downlink synchronization channel of the movement destination cell. However, the lengths of preamble portions of asynchronous random access signals may vary depending upon the sizes of the cells. For example, in the case of a large cell, a preamble portion of an asynchronous random access signal can sometimes occupy plural successive subframes in a large cell; however, the timing at which transmission of an asynchronous random access signal starts is a timing offset by the same prescribed period from a position of a synchronization channel.

When a handover is performed, information on the lengths of the preambles of asynchronous random access signals used in the movement destination cell is reported from the base station in the movement origin to a mobile terminal station for which a handover is being performed.

Additionally, the time offset level is set to a unique value to be used as a common value for all cells in a single mobile communication system. The time offset level can be stored in a storage unit in a mobile terminal station beforehand, and also can be designated by the base station in the handover origin or the handover destination. Using a constant time offset level as described above eliminates the need for a base station to search the entire communication frequency band for the random access signal transmitted from each of the mobile terminal stations during a particular period. This makes it possible to establish connections between the base stations and the mobile terminal devices in a shorter time.

For a mobile terminal station, it is possible to transmit a random access signal at a timing identified by a prescribed offset time (T) on the basis of the position of the synchronization channel used for the establishment of synchronization. Accordingly, compared to a case in which random access signals are received at non-constant timings, the level of necessity at which a needlessly large buffer in base stations has to be secured for absorbing the inconstantness is lowered.

With respect to a synchronization channel, a transmission opportunity (a point in time that is subsequent by the amount of the T offset time) of transmitting a random access signal for every single synchronization channel can be set to once and also to twice or more. For example, transmission opportunities can be set at points in time subsequent by the amounts of the offset times T and T2 for transmitting random access signals. Even when a collision occurs in the first transmission, the next signal can be transmitted without waiting for the transmission of the synchronization channel.

Desirably, the value of T is set to be shorter than a transmission cycle of the synchronization channel. Further, it is appropriate and advantageous to set the value of T to be equal to or shorter than five subframes, and particularly to be three or four subframes in view of performing both an acquisition process and a transmission process of the synchronization channel.

[2] The timing and the frequency for the transmission of the random access signal during the above handover are prevented from being used by another terminal station for which a handover is not being performed.

In other words, a timing and frequency for transmitting a random access signal that are different from those for the mobile station for which a handover is being performed are assigned to a terminal station for which a handover is not being performed.

Thereby, the likelihood that random access signals will collide with each other in the reception unit of the base station in the movement destination (handover destination) and the time consumed by a handover can both be reduced.

[3] When there is no terminal station for which a handover to a cell covered by a base station is going to be performed, the scheduler of the base station assigns the timing and frequency described in [2] (which are exclusively for a terminal station for which a handover is being performed) to uplink signals transmitted from other terminal stations in the cell to the base station. The determination of whether or not there is a terminal station for which a handover is going to be performed is made on the basis of, for example, the signaling (a notice reporting the start of a handover, information on a terminal station for which a handover is being performed, or an instruction requesting the securing of radio resources for a mobile terminal station that is entering to the cell) relating to handovers transmitted from the base stations in adjacent cells or from an aGW (access Gate Way, which corresponds to a base station control device in W-CDMA systems) and also on the basis of a control signal transmitted from a terminal station to the base station in the handover destination in order to directly (or indirectly) report the completion of a handover.

Thereby, it is possible to avoid reduction in the use efficiency of radio resources that would be caused if the radio resources (timing and frequency for transmission of a random access signal by a mobile terminal station for which a handover is being performed) are not used while there is no terminal station for which a handover is going to be performed.

[4] As an index of the CAZAC sequence applied to a preamble portion used with the timing and frequency for transmitting a random access signal when a handover is performed, an index with a small PAPR in the preamble portion is used.

It is possible to reduce the output power back-off amount in a transmission signal amplifier when transmitting a preamble portion. If a back-off amount is reduced, (1) the average transmission power can be increased, and (2) the likelihood of a transmission power shortage can be reduced, and this is advantageous for a terminal station for which a handover is being performed and which needs a high transmission power due to it being near the edge of a cell and distant from the base station.

Indexes with small values of the PAPR are, for example, indexes other than indexes with values of the PAPR of 6 dB or higher in FIG. 2. Also, as indexes with relatively small values of the PAPR, indexes can be selected from the ranges of between 1 and 75, 132 and 168, and 225 and 298. When these ranges are expressed using the sequence length L, indexes can be selected from ranges of between 1 and L/3, L/2−L/16 and L/2+L/16, and 2L/3 and L−1.

[5] Information on the index of the CAZAC sequence applied to the preamble portion used with the timing and frequency for transmitting a random access signal so as to perform a handover is reported from the terminal station for which a handover is being performed to the base station in the handover origin.

[6] As an index of the CAZAC sequence applied to a preamble portion used for a handover, an index with a small PAPR is used. A small PAPR used here is a PAPR that causes only a slight backing off of the operating point of a transmission signal amplifier so that a random access signal transmitted within a normal transmission power from a mobile terminal station near the edge of a cell covered by a base station can normally be received by the base station. A sequence having the correct index that should be used for whatever situation the mobile station is in is calculated and determined beforehand.

[7] Information on the index of the CAZAC sequence applied to the preamble portion used for a handover is reported from the base station in the handover source to the terminal station for which a handover is going to be performed when the handover is actually performed.

Figure 3:
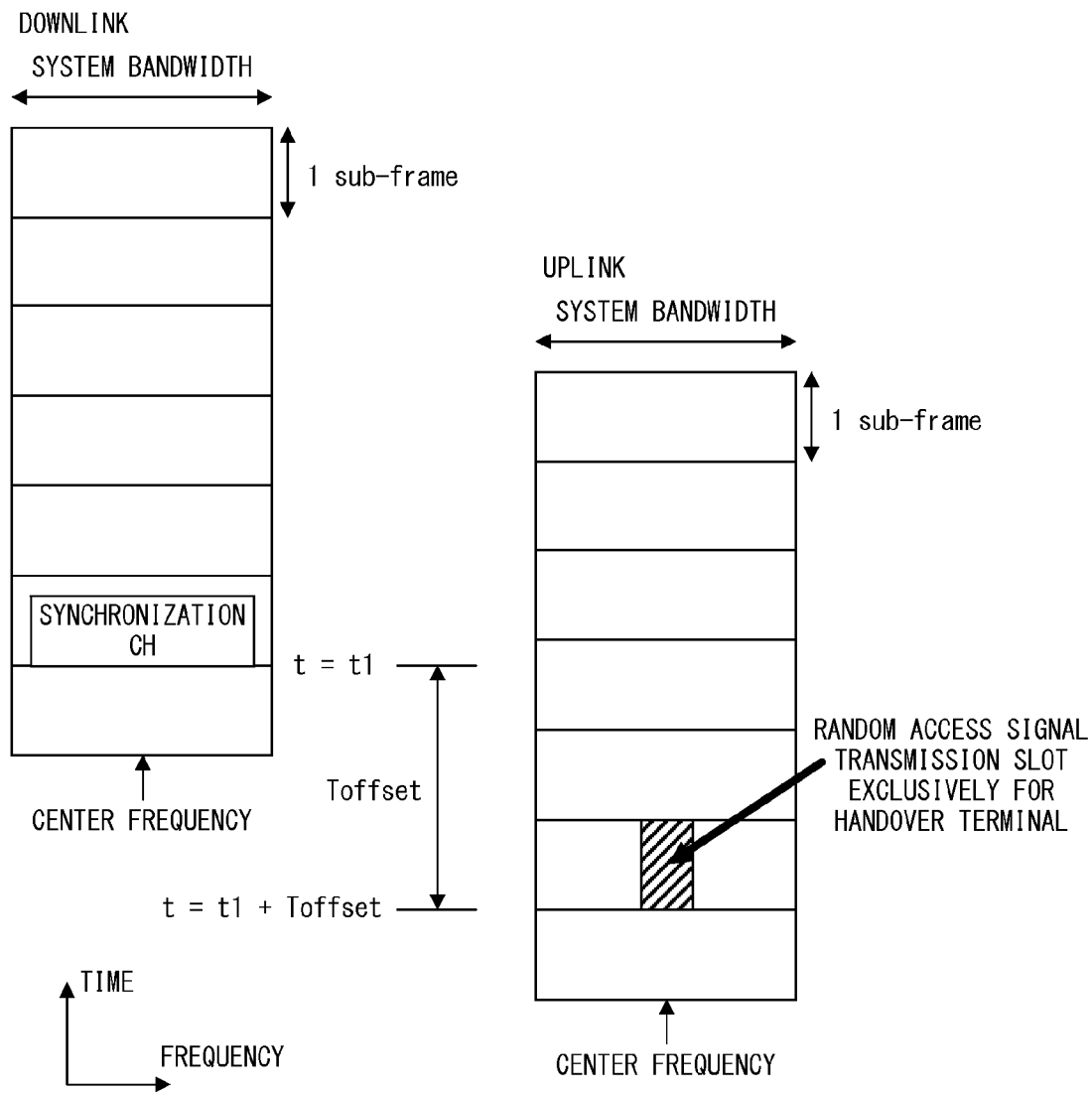
FIG. 3 illustrates the first principle of an embodiment of the present invention.

FIG. 3 illustrates the first principle of an embodiment of the present invention.

FIG. 3 illustrates arrangements of the downlink and uplink signals in the frequency and time directions, with the horizontal axis representing the frequencies and the vertical axis representing the time. A synchronization channel is set around the center frequency of the system bandwidth among subframes transmitted in the downlink. A synchronization channel is not contained in all subframes transmitted in the downlink, but is contained in, for example, every five or ten subframes to be transmitted. Before the synchronization is established between a mobile terminal station and a base station, the uplink and downlink signals are asynchronous. Thus, in an embodiment of the present invention, when a synchronization channel is detected in a downlink signal, a random access signal is contained (accommodated) in an uplink subframe corresponding to the time point subsequent to that time by the time offset Toffset, and the signal is transmitted to a base station from a mobile terminal. The frequency used for accumulating the random access signal is near the center frequency in the system bandwidth of the uplink because a downlink synchronization channel is near the center frequency of the system bandwidth. In the example of FIG. 3, a slot shaded with diagonal lines is used for transmitting a random access signal. A random access signal to be transmitted can be inserted into plural successive subframes; however, only an uplink subframe corresponding a time point subsequent to the synchronization channel by the time offset Toffset can be used as the subframe for starting the transmission of the random access signal regardless of the length of the random access signal. If the transmission of a random access signal fails (when a response signal is not transmitted from the base station), the random access signal is inserted into the same position (uplink subframes subsequent to the timing of another synchronization channel to be transmitted subsequently by the time offset Toffset), and is retransmitted. As a matter of course, when plural opportunities to transmit a random access signal have been given to a single synchronization channel, the random access signal can be transmitted at the next transmission opportunity.

Figure 4:
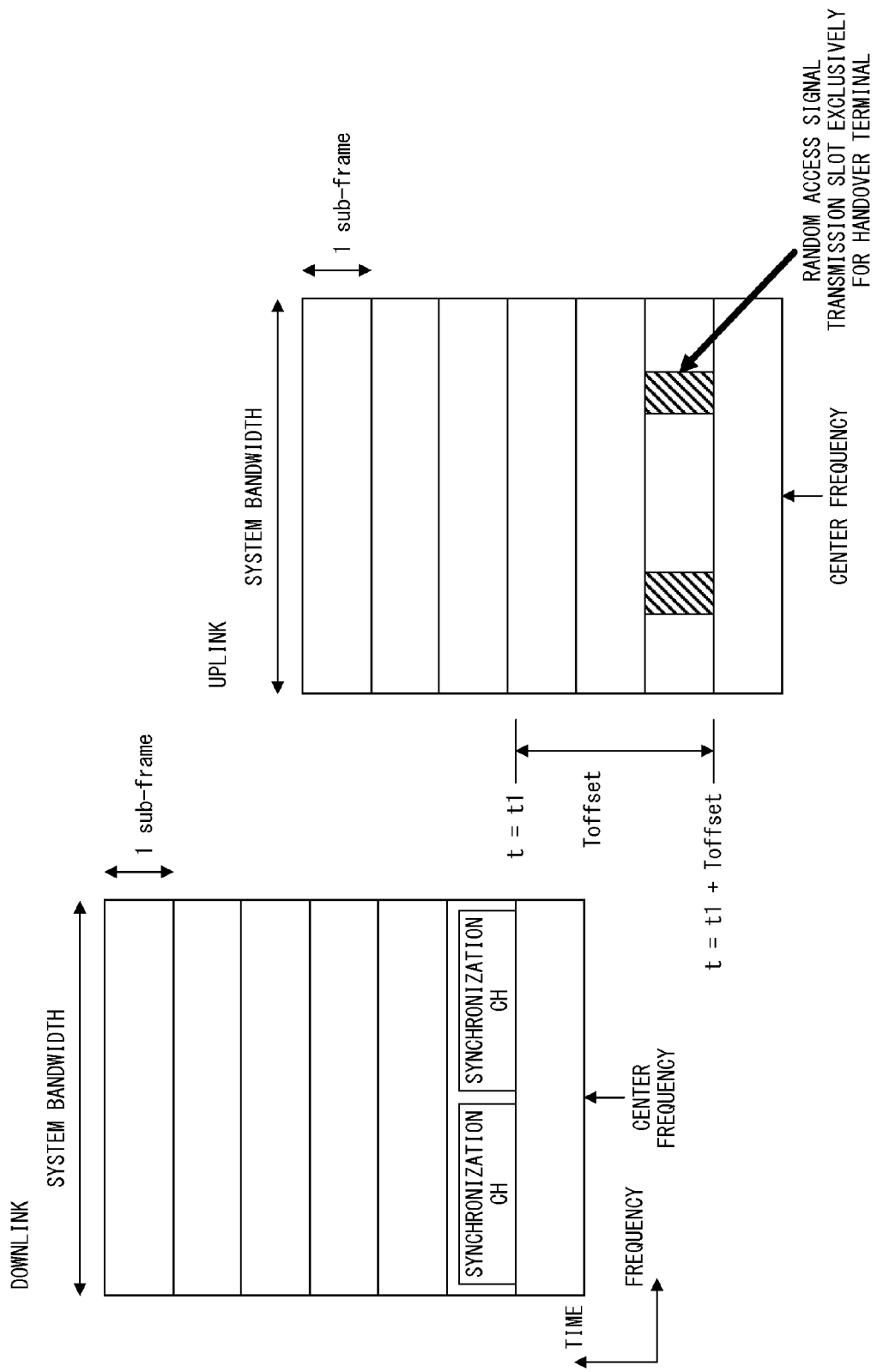
FIG. 4 illustrates the second principle of an embodiment of the present invention.

FIG. 4 illustrates the second principle of an embodiment of the present invention.

In FIG. 4, similarly to the example in FIG. 3, uplink and downlink signals are illustrated with the horizontal axis representing the frequencies and the vertical axis representing the time. In FIG. 4, a configuration is employed in a case in which the system bandwidth is wide and the receiving band of a receiving mobile terminal station is only half the system bandwidth. A downlink signal has synchronization channels set around two frequencies in a single subframe (however, synchronization channels may be set at three or more positions). In an embodiment of the present invention, a frequency used for transmitting a random access signal of a terminal station for which a handover is being performed is a frequency in the frequency band of the uplink signal, said frequency corresponding to the frequency at which synchronization channels are set in the system bandwidth of the uplink signal. For example, when synchronization channels are near the center portions respectively of two bands obtained by dividing the frequency band of the downlink, random access signals as well are near the center portions respectively of two bands obtained by dividing the frequency band of the uplink. The timing of starting a transmission of a random access signal is in a subframe of an uplink signal corresponding to a time point subsequent to the time point of the detection of a synchronization signal in a downlink signal by the time offset Toffset. In FIG. 4, portions shaded with diagonal lines are slots in which the transmission of random access signals starts. Because there are synchronization channels in two slots in a downlink signal, there are also two slots that can be used for transmitting a random access signal in an uplink signal. A random access signal to be transmitted can be inserted into plural successive subframes; however, only an uplink subframe corresponding to a time point subsequent to the synchronization channel by the time offset Toffset can be used as the subframe for starting the transmission of the random access signal regardless of the length of the random access signal. If transmission of a random access Signal fails (when a response signal is not transmitted from the base station), the random access signal is inserted into the same position (uplink subframes subsequent to the timing of another downlink synchronization channel to be transmitted subsequently by the time offset Toffset) to be retransmitted.

Figure 5:
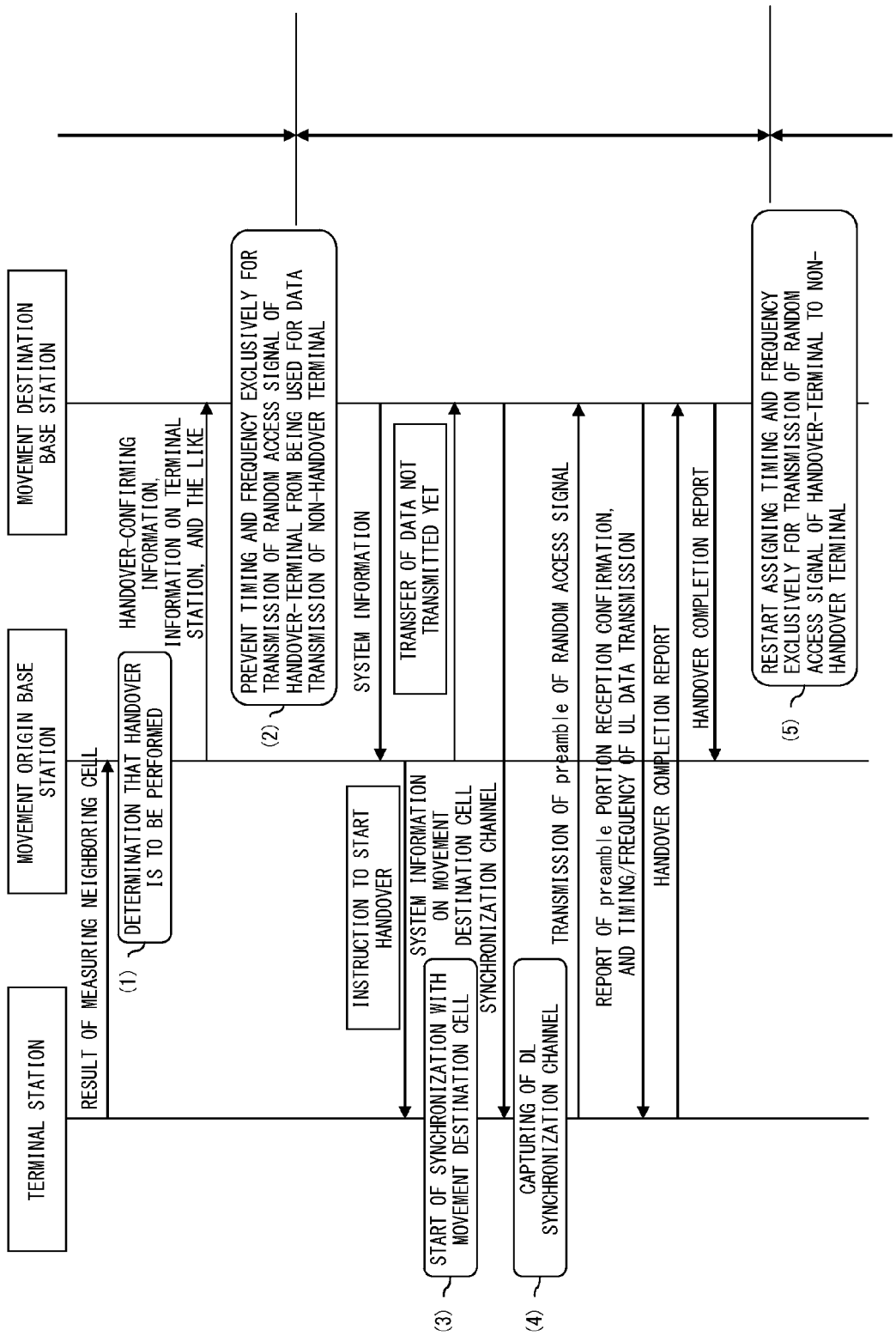
FIG. 5 illustrates a sequence used when a handover is performed on the basis of an embodiment of the present invention (first)
Figure 6:
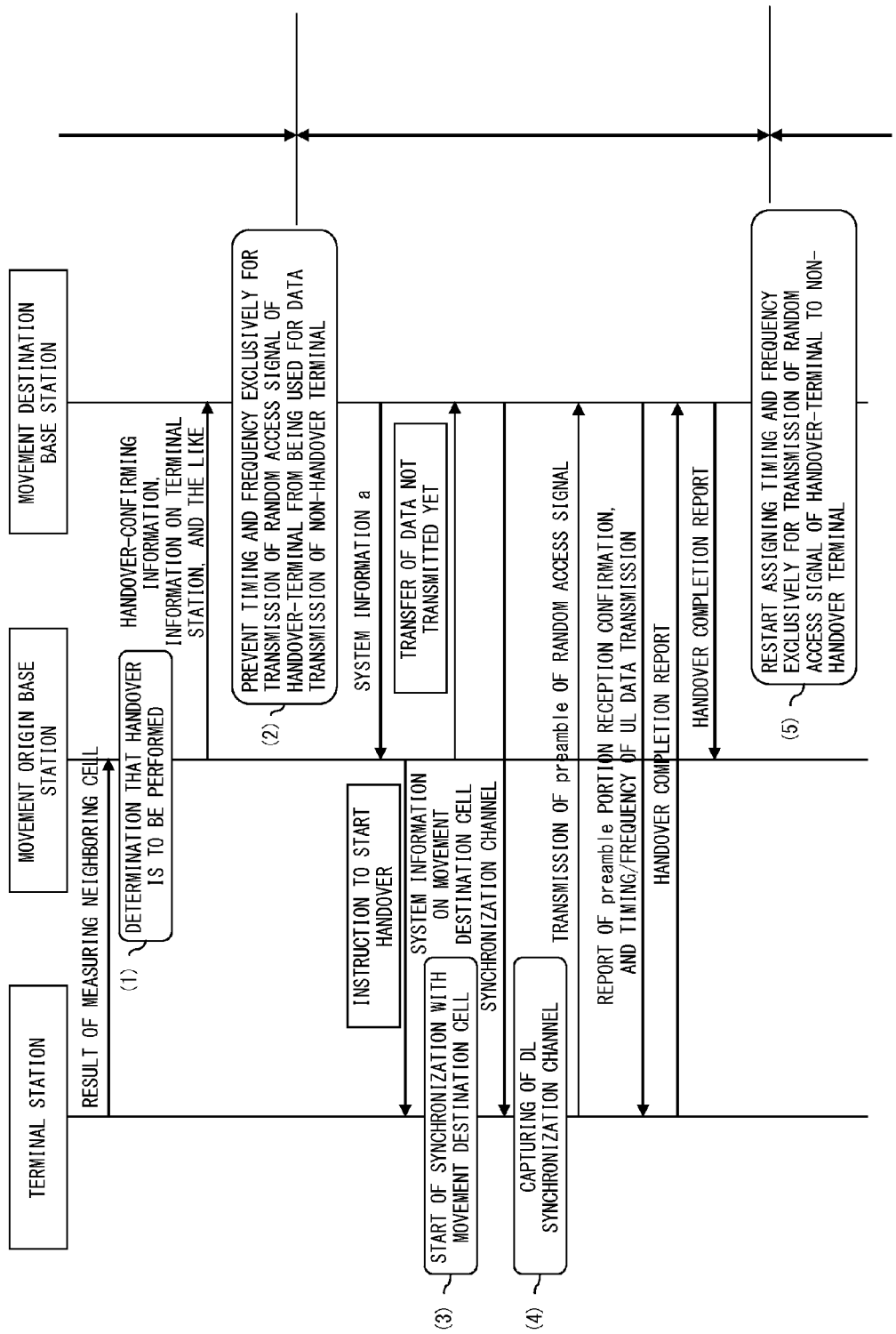
FIG. 6 illustrates a sequence used when a handover is performed on the basis of an embodiment of the present invention (second)

FIGS. 5 through 7 illustrate sequences for performing a handover according to an embodiment of the present invention.

FIG. 5 illustrates the first example. In FIG. 5, a (mobile) terminal station transmits to the movement destination base station a result of measuring a received power of a signal (a pilot signal or the like) transmitted from a neighboring cell, and the movement origin base station determines that it should perform a handover (1). Then, the movement origin base station transmits information confirming that a handover is going to be performed, information on the mobile terminal station, and the like. Obtaining the information from the movement origin base station, the movement destination base station sets a timing and frequency to be used for transmitting a random access signal exclusively for the mobile terminal station for which the handover is going to be performed in such a manner that the set timing and frequency are not assigned to an uplink data transmission by another mobile terminal station for which a handover is not going to be performed (2). As already described, the above timing is a timing subsequent to the reception of the synchronization signal by the terminal station by the time offset, and the above frequency is a frequency in the uplink corresponding to the frequency used for transmitting a downlink synchronization channel. When there is no terminal station for which a handover is going to be performed during a period between a state in which the terminal station is communicating with the movement origin base station and the state of (2), the timing and frequency for transmitting a random access signal of a terminal station for which a handover is being performed can be assigned to a terminal station for which a handover is not going to be performed. When the movement destination base station has completed the setting of (2), system information including the sequence index of the CAZAC sequence of the random access signal used for the handover is transmitted to the movement source base station. At that time, a CAZAC sequence with a small PAPR is selected to be transmitted. As was already described, indexes with small PAPRs are, for example, indexes other than indexes with PAPRs of 6 dB or higher in FIG. 2. Also, indexes can be selected from the ranges of between 1 and 75, 132 and 168, and 225 and 298 as indexes with relatively small PAPRs. When these ranges are expressed using the sequence length L, indexes can be selected from ranges of between 1 and L/3, L/2−L/16 and L/2+L/16, and 2L/3 and L−1.

However, the setting of (2) can be performed after the transmission of the system information, etc. to the movement origin base station. The movement origin base station that received the system information, etc. transmits to the mobile terminal station for which a handover is being performed system information on the movement destination cell including the sequence index of the CAZAC sequence used for the handover in order to instruct the mobile terminal station to start the handover. Thereafter, while still having data to transmit to the terminal station, the movement origin base station transfers that data to the movement destination base station. However, such data may also be transferred after the handover has succeeded.

Having received an instruction to start the handover, the terminal station starts synchronizing itself with the movement destination cell. The terminal station captures a downlink synchronization channel from the movement destination base station (4), and transmits a preamble portion of a random access signal (synchronization establishment signal) to the movement destination base station. Control information or the like may be included in the preamble portion in a multiplexing manner (code multiplexing, time multiplexing, etc.). For a transmission of the preamble portion of the random access signal, timing and frequency for the transmission of a random access signal exclusively for a terminal station for which a handover is being performed are used. When the movement destination base station has received the preamble portion of the random access signal and succeeded in properly recognizing the sequence in the preamble portion, a preamble portion reception confirmation and the timing and frequency for transmitting uplink data are reported to the terminal station. Having received this information, the terminal station transmits a handover completion report signal to the movement destination base station. The movement destination base station, having received this signal, transmits the handover completion report signal to the movement origin base station after a process necessary for establishing a wireless link with the terminal station is completed. Thereafter, the movement destination base station restarts releasing the timing and frequency for a transmission of a random access signal exclusively for a terminal station for which a handover is being performed so that they can be used for transmitting uplink data for terminals for which a handover is not being performed (5).

The period between (2) and (5) in FIG. 5 is a period during which a timing and frequency for transmission of a random access signal of a terminal station for which a handover is being performed are exclusively assigned to the terminal station for which a handover is being performed. After setting (5), a timing and frequency for transmission of a random access signal of a terminal station for which a handover is being performed are assigned to a terminal station for which a handover is not being performed when there is not a terminal station for which a handover is being performed.

FIG. 6 illustrates the second example. In FIG. 6, a (mobile) terminal station transmits to the movement origin base station a result of measuring a received power or the like of a signal (pilot signal or the like) from a neighboring cell, and the movement destination base station determines that a handover is to be performed (1). Thereafter, the movement origin base station transmits information confirming that a handover is going to be performed, information on the mobile terminal station, and the like to the movement destination base station. Obtaining the information from the movement origin base station, the movement destination base station sets a timing and frequency to be used for transmitting a random access signal exclusively for the mobile terminal station for which the handover is going to be performed in such a manner that the set timing and frequency are not assigned to uplink data transmission by another mobile terminal station for which a handover is not going to be performed (2). As already described, the above timing is a timing subsequent to the reception of the synchronization signal by the terminal station by the amount of time in the time offset, and the above frequency is a frequency in the uplink corresponding to the frequency used for transmitting a downlink synchronization channel. When there is no terminal station for which a handover is going to be performed during a period between the state in which the terminal station is communicating with the movement origin base station and the state of (2), the timing and frequency for transmitting a random access signal of a terminal station for which a handover is being performed can be assigned to a terminal station for which a handover is not going to be performed. In the first example illustrated in FIG. 5, when the movement destination base station has completed the setting of (2), system information including the sequence index of the CAZAC sequence of the random access signal used for the handover is transmitted to the movement source base station. However, the setting of (2) may be performed after the transmission of the system information, etc. to the movement origin base station. However, in the second example illustrated in FIG. 6, which of the sequences is to be used as the CAZAC sequence for the random access signal is determined beforehand by system design or the like, and information on the CAZAC sequence is not included in the information transmitted from the movement destination base station to the mobile terminal station via the movement origin base station. The movement origin base station transmits the system information on the movement destination cell to the mobile terminal station, and instructs the mobile terminal station to start the handover. Thereafter, when the movement origin base station still has data to transmit to the terminal station, it transfers that data to the movement destination base station. However, such data may also be transferred after the handover has succeeded.

Having received an instruction to start the handover, the terminal station starts synchronizing itself with the movement destination cell (3). The terminal station captures a downlink synchronization channel transmitted from the movement destination base station (4), and transmits a preamble portion of a random access signal to the movement destination base station. Control information or the like may be included in the preamble portion in a multiplexing manner (code multiplexing, time multiplexing, etc.). For the transmission of the preamble portion of the random access signal, the timing and frequency for the transmission of a random access signal exclusively for a terminal station for which a handover is being performed are used. When the movement destination base station has received the preamble portion of the random access signal and has succeeded in properly recognizing the sequence of the preamble portion, a preamble portion reception confirmation and timing and frequency for transmitting uplink data are reported to the terminal station. Having received this information, the terminal station transmits a handover completion report signal to the movement destination base station. The movement destination base station, having received this signal, transmits the handover completion report signal to the movement origin base station after a process necessary for establishing a wireless link with the terminal station is completed. Thereafter, the movement destination base station restarts assigning timing and frequency for transmission of a random access signal exclusively for a terminal station for which a handover is being performed as timing and frequency for transmitting uplink data for terminals for which a handover is not being performed.

The period between (2) and (5) in FIG. 6 is a period during which the timing and frequency for the transmission of a random access signal of a terminal station for which a handover is being performed are exclusively assigned to a terminal station for which a handover is being performed. After setting (5), the timing and frequency for the transmission of a random access signal of a terminal station for which a handover is being performed are assigned to a terminal station for which a handover is not being performed when there is not a terminal station for which a handover is being performed.

FIG. 7 illustrates the third example. In FIG. 7, a (mobile) terminal station transmits to the movement origin base station a result of measuring a received power or the like of a signal (pilot signal or the like) from a neighboring cell, and the movement destination base station determines that a handover is to be performed (1). Thereafter, the movement origin base station transmits information confirming that a handover is going to be performed, information on the mobile terminal station, and the like. In the third example, timing and frequency are set beforehand to be exclusively for the transmission of a random access signal for a mobile terminal station for which a handover is being performed in order to prevent the timing and frequency from being used for other purposes. As was already described, the above timing is a timing subsequent to the reception of the synchronization signal by the terminal station by the amount of time in the time offset, and the above frequency is a frequency in the uplink corresponding to the frequency used for transmitting a downlink synchronization channel. The movement destination base station transmits to the movement origin base station the system information, including the sequence index of the CAZAC sequence for the random access signal used for the handover. The movement origin base station transmits the system information on the movement destination base station to the mobile terminal station, and instructs the mobile terminal station to start the handover. Thereafter, the movement origin base station has data yet to be transmitted to the terminal station, it transfers that data to the movement destination base station. However, such data may also be transferred after the handover has succeeded.

Having received an instruction to start the handover, the terminal station starts synchronizing itself with the movement destination cell (2). The terminal station captures a downlink synchronization channel from the movement destination base station (3), and transmits a preamble portion of a random access signal to the movement destination base station. For the transmission of the preamble portion of the random access signal, the timing and frequency for the transmission of a random access signal exclusively for a terminal station for which a handover is being performed are used. When the movement destination base station has received the preamble portion of the random access signal and succeeded in properly recognizing the sequence of the preamble portion, a preamble portion reception confirmation and a timing and frequency for transmitting uplink data are reported to the terminal station. Having received this information, the terminal station transmits a handover completion report signal to the movement origin base station after a process necessary for establishing a wireless link with the terminal station.

Figure 8:
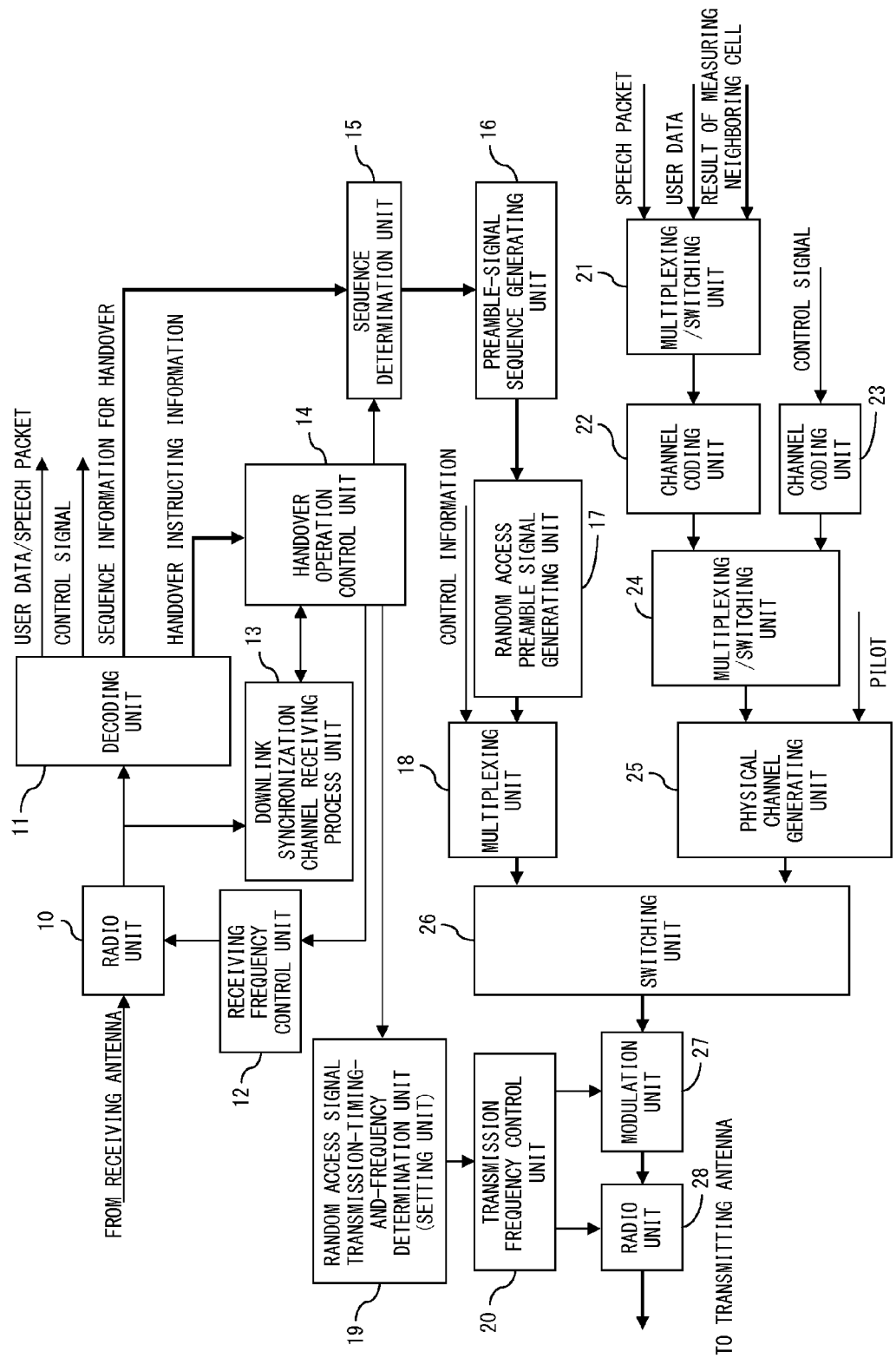
FIG. 8 is a block diagram illustrating a mobile terminal station according to an embodiment of the present invention.

FIG. 8 is a block diagram illustrating a mobile terminal station according to an embodiment of the present invention.

When a receiving antenna has received a signal, a radio unit 10 demodulates the signal and a decoding unit 11 decodes the signal in order to obtain user data/speech packets, a control signal, sequence information used for a handover, and a handover instructing signal. Outputs from the DFT unit 10 are input into a downlink synchronization channel receiving process unit 13. Thereafter, a process of receiving a synchronization channel is performed, and a reception result is input into a handover operation control unit 14. The handover operation control unit 14 controls a receiving frequency control unit 12, a sequence determination unit 15, and a random-access-signal transmission-timing-and-frequency determination unit 19. The reception frequency control unit 12 controls frequency used when receiving a synchronization channel. The sequence determination unit 15 determines a sequence to be used for a random access signal. As an example, a sequence used for a random access signal may be reported from the radio base station in the handover origin. The random-access-signal transmission-timing-and-frequency determination unit 19 determines a timing and frequency for a random access signal.

In response to the determination by the random-access-signal transmission-timing-and-frequency determination unit 19, a transmission frequency control unit 20 controls a radio unit 28 and a modulation unit 27 in order to transmit a random access signal at the timing and frequency determined in the present invention. When which sequence is to be used has been determined by the sequence determination unit 15, the determined sequence is generated by a preamble-signal sequence generating unit 16, and a random access preamble signal generating unit 17 uses this sequence in order to generate a preamble signal containing a random access signal. This preamble signal is combined with control information in a multiplexing manner by a multiplexing unit 18, and the resultant information is input into a switching unit 26.

A speech packet, user data, and a result of measuring a neighboring cell are input into a multiplexing/switching unit 21, are output in a combined (multiplexed) state or in a one-by-one manner, and are coded by a channel coding unit 22. A control signal as well is coded by another channel coding unit 23. Outputs from the channel coding units 22 and 23 are output by another multiplexing/switching unit 24 in a combined (multiplexed) state or in a one-by-one manner, are mapped onto a physical channel by a physical channel generating unit 25, and are input into the switching unit 26. The switching unit 26 switches between signals from the multiplexing unit 18 and signals from the physical channel generating unit 25 to output to the transmitting antenna via the modulation unit 27 and the radio unit 28.

Figure 9:
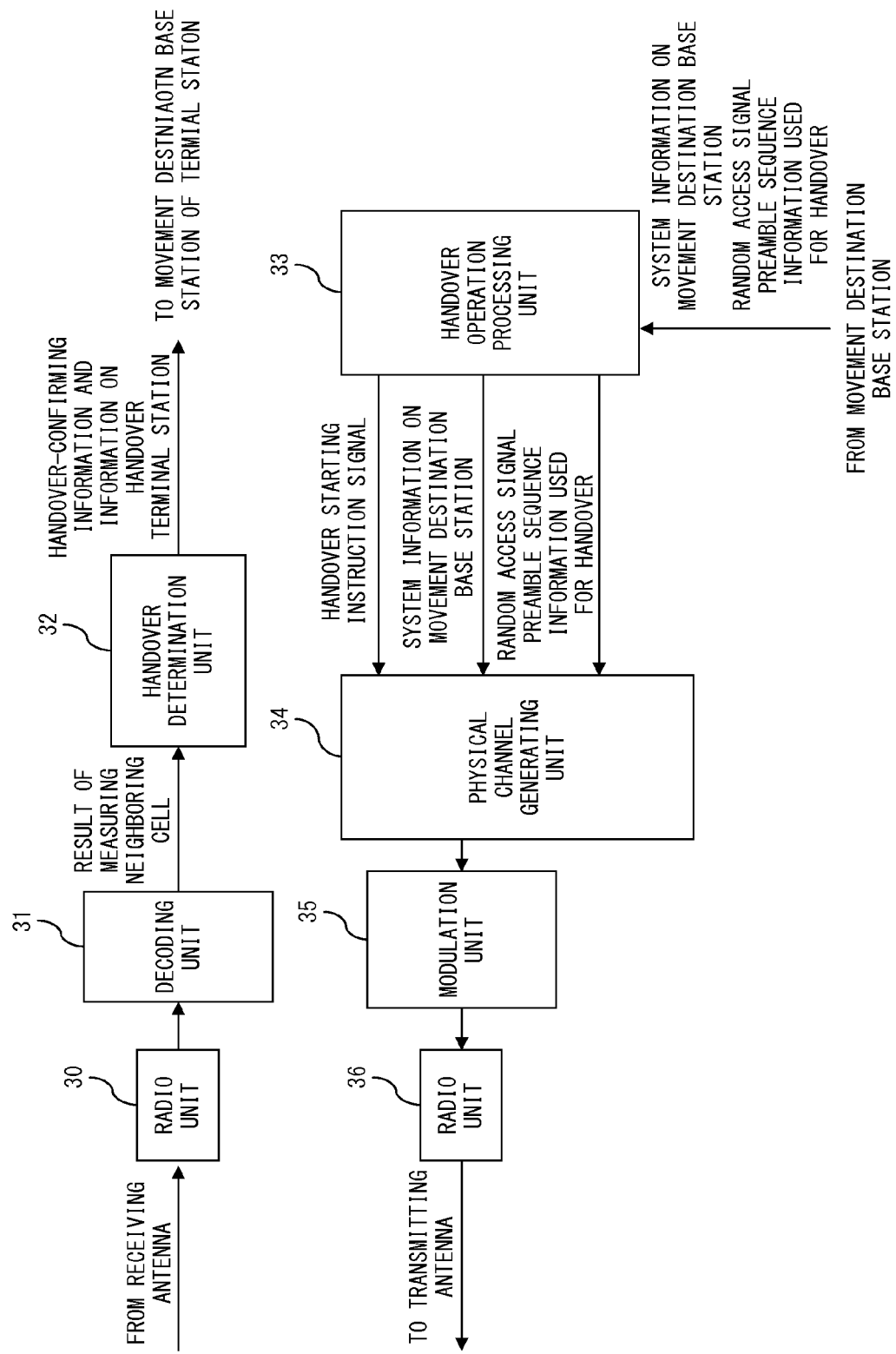
FIG. 9 is a block diagram illustrating a configuration of a movement origin base station when a handover is performed according to the present invention.

FIG. 9 is a block diagram illustrating a configuration of a movement origin base station when a handover is being performed according to an embodiment of the present invention.

A signal received by a receiving antenna is demodulated by a radio unit 30, and is decoded by a decoding unit 31. A result of measuring a neighboring cell is obtained from the decoded signal and is used for a handover determination unit 32 to determine whether or not a handover is to be performed for the terminal station that has sent that result. When it has been determined that a handover should be performed, information confirming the performing of the handover and information on the terminal station for which the handover is going to be performed are transmitted to the movement destination base station.

Having received system information on the movement destination base station and random access signal preamble sequence information used for the handover (for example, information on the sequence length L and the index k for recognizing a sequence with a PAPR, or the like) transmitted from the movement origin base station, a handover operation processing unit 33 generates random access signal preamble sequence information used for the handover and a handover starting instruction signal, and system information on the movement destination base station. A physical channel generating unit 34 maps the generated information onto a physical channel. The resultant information is transmitted through the transmitting antenna after going through a modulation unit 35 and a radio unit 36.

FIG. 10 is a block diagram representing a configuration of a movement destination base station when a handover is being performed according to an embodiment of the present invention.

First, handover confirmation information and handover target terminal information are received from the movement origin base station of a terminal station for which a handover is being performed. Thereafter, a handover operation processing unit 42 transmits to the movement origin base station random access signal preamble sequence information used for the handover and the system information on the base station. Further, the handover operation processing unit 42 requests that an uplink radio resource management unit 47 prohibit other stations from using the timing and frequency for the random access signal of the terminal station for which the handover is going to be performed and that it assign an uplink radio resource to be used until the handover for the terminal station is completed. The uplink radio resource management unit 47 transmits information on the assignment of an uplink radio resource to the mobile terminal station via a physical channel generating unit 48, a modulation unit 49, and a radio unit 50.

When a signal from the terminal station for which the handover is to be performed is received via the receiving antenna, a radio unit 40, and a decoding unit 41, a received random access signal detection processing unit 43 attempts to detect reception of a random access signal that may have been received in order to determine whether or not a random access signal was transmitted. The process of detecting the preamble portion of a random access signal is performed by the received random access signal detection processing unit 43 under control of the handover operation processing unit 42 and a received preamble confirmation unit 44. When detecting reception of a random access signal, the received preamble confirmation unit 44 transmits reception confirmation information on the preamble portion to the terminal station via the physical channel generating unit 48, the modulation unit 49, and the radio unit 50. Having received the random access signal, a random access signal receiving timing detection unit 45 detects the timing at which the random access signal was received, and calculates a gap in the transmission timing from the terminal station, generates an uplink transmission timing correction information signal, and transmits this signal to the terminal station via the physical channel generating unit 48, the modulation unit 49, and the radio unit 50.

Receiving a terminal station handover process completion reporting signal transmitted from the terminal station, a handover completion determination unit 46 determines that the handover has been completed, and transmits a request to the uplink radio resource management unit 47 to release the timing and frequency for the random access signal for the terminal station for which the handover has been performed. When a process necessary for establishing a wireless link with the terminal station is completed, a handover completion report is transmitted to the movement origin base station. In addition, the synchronization channel transmitted from the movement destination base station when a handover is performed is transmitted via the physical channel generating unit 48, the modulation unit 49, the radio unit 50, and the transmitting antenna.

The above configuration corresponds to the sequence illustrated in FIG. 5. However, configurations corresponding to FIGS. 6 and 7 will be easily conceived by those skilled in the art.

The invention claimed is:

1. A mobile station establishing an uplink wireless connection by transmitting a random access signal through a random access channel after receiving a synchronization channel transmitted from a radio base station in a handover destination, comprising:
a controller configured to set a timing of transmitting the random access signal to the base station to be later than the timing of receiving the synchronization channel by a prescribed period.

2. A mobile station according to claim 1, further comprising:
a transmitter to transmit the random access signal through the random access channel.

3. A mobile station capable of establishing an uplink wireless connection by transmitting a random access signal through a random access channel after receiving a synchronization channel transmitted from a radio base station in a handover destination, comprising:
a circuit configured to restrict a CAZAC sequence used as a preamble of the random access signal to a prescribed CAZAC sequence from among a plurality of CAZAC sequences with different indexes, and generating the preamble of the random access signal using the prescribed CAZAC sequence.

4. A mobile station according to claim 3, wherein:
the prescribed CAZAC sequence has a PAPR smaller than PAPRs of the plurality of CAZAC sequences.

5. A mobile station according to claim 3, wherein:
when a Zadoff-Chu sequence is used as the CAZAC sequence, a sequence whose index is selected from a range of between 1 and L/3, L/2−L/16 and L/2+L/16, and 2L/3 and L−1 is used as the prescribed CAZAC sequence, where L is a sequence length.

6. A mobile station according to claim 3, further comprising:
a transmitter to transmit the random access signal through the random access channel.

7. A mobile station establishing an uplink wireless connection by transmitting a random access signal through a random access channel after receiving a synchronization channel transmitted from a radio base station in a handover destination, comprising:
an integrated circuit configured to set a timing of transmitting the random access signal to the base station to be later than the timing of receiving the synchronization channel by a prescribed period; and
a transmitter to transmit the random access signal through the random access channel.

* * * * *